(12) United States Patent
Li et al.

(10) Patent No.: US 9,828,650 B2
(45) Date of Patent: Nov. 28, 2017

(54) METHOD OF MANUFACTURING A SLIDING CAMSHAFT

(71) Applicant: GM GLOBAL TECHNOLOGY OPERATIONS LLC, Detroit, MI (US)

(72) Inventors: Huaxin Li, Rochester Hills, MI (US); Glenn E. Clever, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/015,739

(22) Filed: Feb. 4, 2016

(65) Prior Publication Data

US 2017/0226606 A1  Aug. 10, 2017

(51) Int. Cl.
| | | |
|---|---|---|
| *C21D 9/30* | (2006.01) | |
| *C21D 1/06* | (2006.01) | |
| *C21D 1/22* | (2006.01) | |
| *C21D 1/58* | (2006.01) | |
| *C21D 6/00* | (2006.01) | |
| *C22C 38/00* | (2006.01) | |
| *C22C 38/02* | (2006.01) | |
| *C22C 38/04* | (2006.01) | |
| *C22C 38/44* | (2006.01) | |
| *C23C 8/22* | (2006.01) | |
| *F16H 53/02* | (2006.01) | |

(52) U.S. Cl.
CPC ............ *C21D 9/30* (2013.01); *C21D 1/06* (2013.01); *C21D 1/22* (2013.01); *C21D 1/58* (2013.01); *C21D 6/004* (2013.01); *C21D 6/005* (2013.01); *C21D 6/008* (2013.01); *C22C 38/002* (2013.01); *C22C 38/02* (2013.01); *C22C 38/04* (2013.01); *C22C 38/44* (2013.01); *C23C 8/22* (2013.01); *F16H 53/025* (2013.01); *C21D 2211/008* (2013.01)

(58) Field of Classification Search
CPC .... C23C 8/46; C23C 8/50; C23C 8/56; C23C 8/20; C23C 8/22; C23C 8/30; C23C 8/32; C23C 8/44; C23C 8/54
See application file for complete search history.

(56) References Cited

U.S. PATENT DOCUMENTS 5,595,610 A * 1/1997 Maeda ............... C21D 1/78
148/233

* cited by examiner

*Primary Examiner* — Jessee Roe
(74) *Attorney, Agent, or Firm* — Quinn IP Law

(57) ABSTRACT

A method of manufacturing a sliding camshaft for an internal combustion engine includes providing the sliding camshaft from a steel alloy having a carbon content between 0.25% and 0.60%. The sliding camshaft is then processed with a carbon infusing heat treatment process, such as carburization or carbonitriding. After the sliding camshaft has been processed with the carbon infusing heat treatment process, the sliding camshaft is then processed with a quenching heat treatment process, such as a mar-quenching heat treatment process.

13 Claims, 1 Drawing Sheet

METHOD OF MANUFACTURING A SLIDING CAMSHAFT

TECHNICAL FIELD

The disclosure generally relates to a method of manufacturing a sliding camshaft for an internal combustion engine.

BACKGROUND

Some internal combustion engines include an adjustable or slideable camshaft assembly. The camshaft assembly includes a base camshaft that is rotatable about a cam axis, and a sliding camshaft that is slideably attached to the base camshaft for axial movement along the cam axis relative to the base camshaft. The sliding camshaft is rotatable with the base camshaft about the cam axis. The sliding camshaft is moveable between at least two different axial positions along the cam axis, relative to the base camshaft. Each different position of the sliding camshaft presents a different cam lobe having a different lobe profile for engaging a respective valve stem of the engine. Accordingly, by adjusting the position of the sliding camshaft along the cam axis relative to the base camshaft, the cam profile that each valve stem of the engine follows may be changed. It is known to form the sliding camshaft from a high carbon steel, such as AISI 52100 alloy steel.

SUMMARY

A method of manufacturing a sliding camshaft for an internal combustion engine is provided. The method includes providing the sliding camshaft from a steel alloy having a carbon content between 0.25% and 0.60%. The sliding camshaft is then processed with a carbon infusing heat treatment process. After the sliding camshaft has been processed with the carbon infusing heat treatment process, the sliding camshaft is then processed with a quenching heat treatment process, such as a mar-quenching heat treatment process.

Accordingly, by providing the sliding camshaft from the steel alloy with the carbon content between 0.25% and 0.60%, and then heat treating the formed sliding camshaft with the carbon infusing and mar-quenching heat treatment processes, the resultant sliding camshaft includes a high surface hardness having a lower toughness, while maintaining a softer core having a lower hardness but higher toughness. Such a sliding camshaft exhibits a higher surface wear resistance with less dimensional distortion than sliding camshafts formed from high carbon steel alloys, such as the AISI 52100 alloy steel.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

As used herein, the term "toughness" is defined as the ability of a workpiece to absorb energy and plastically deform without fracturing, the amount of energy per unit volume that a workpiece can absorb before rupturing, or a workpiece's resistance to fracture when stressed. As used herein, the term "hardness" is defined as a measure of how resistant a workpiece is to various kinds of permanent shape change when a compressive force is applied.

Figure 1:
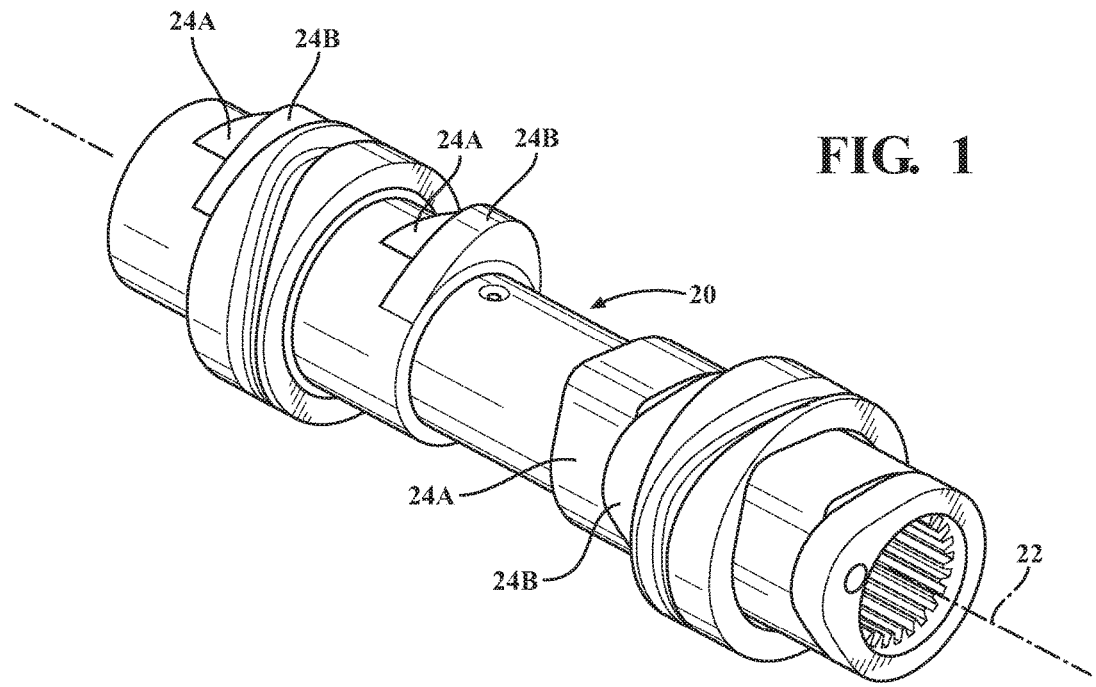
FIG. 1 is a schematic perspective view of a sliding camshaft for an internal combustion engine.

Referring to the Figures, wherein like numerals indicate like parts throughout the several views, a sliding camshaft for an internal combustion engine (not shown) is generally shown at 20 in FIG. 1. When assembled, the sliding camshaft 20 is disposed about a base camshaft (not shown). The base camshaft is rotatable about a cam axis 22. The sliding camshaft 20 is slideably attached to the base camshaft for axial movement along the cam axis 22 relative to the base camshaft. The sliding camshaft 20 is rotatable with the base camshaft about the cam axis 22. The sliding camshaft 20 is moveable between at least two different axial positions along the cam axis 22, relative to the base camshaft. Each different position of the sliding camshaft 20 presents a different cam lobe 24A, 24B having a different lobe profile for engaging a respective valve stem (not shown) of the engine, as is known in the art. Accordingly, by adjusting the position of the sliding camshaft 20 along the cam axis 22 relative to the base camshaft, the cam profile that each valve stem of the engine follows may be changed. The specific design and/or configuration of the sliding camshaft 20 is not pertinent to the detailed description, and is therefore not described in detail herein.

In order to provide superior wear resistance and durability, the sliding camshaft 20 should be formed to include a surface hardness equal to or greater than HRC 60 on the Rockwell hardness scale, and a hardness equal to or greater than HRC 58 on the Rockwell harness scale at a depth of 1.5 mm from the surface of the sliding camshaft 20. Additionally, the sliding camshaft 20 should include a core hardness equal to or greater than HRC 40 on the Rockwell hardness scale at the thickest wall locations of the sliding camshaft 20 to allow or permit addition of compressive residual stresses. The present disclosure provides a novel method of manufacturing the sliding camshaft 20, so that the sliding camshaft 20 exhibits the required hardness characteristics noted above. Additionally, the process described herein produces very little to no distortion in the geometric shape of the sliding camshaft 20 during the manufacture and heat treatment thereof.

Figure 2:
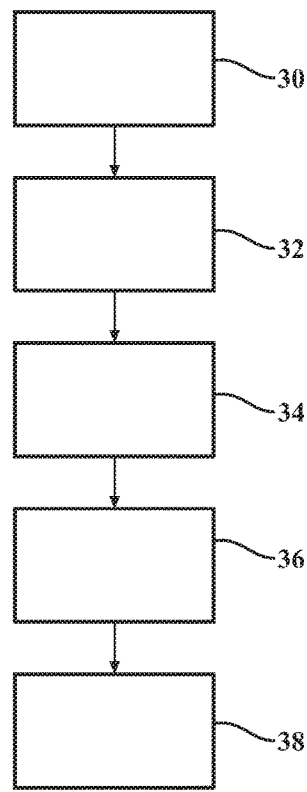
FIG. 2 is a flowchart representing a method of manufacturing the sliding camshaft.

Referring to FIG. 2, the method of manufacturing the sliding camshaft 20 includes providing the sliding camshaft 20 from a steel alloy having a carbon content between 0.25% and 0.60%. The step of providing the sliding camshaft 20 is generally indicated by box 30 in FIG. 2. Steel alloys having a carbon content of between 0.25% and 0.60% by weight may be generally referred to as low carbon steels. The steel alloy may further include between 0.5% and 2% by weight Chromium, between 0.5% and 2.0% by weight Manganese, between 0% and 3.5% by weight Nickel, between 0% and 0.8% by weight Molybdenum, between 0% and 0.1% by weight Silicon, a maximum of 0.1% by weight Sulfur, and a maximum of 0.05% by weight Phosphorous. An exemplary embodiment of the steel alloy includes SAE4340 steel. Providing the sliding camshaft 20 may include forming the sliding camshaft 20 to define a desired shape using standard forming and/or milling processes known to those skilled in the art, such as forging, milling, grinding, stamping, drilling, machining, etc., or other shaping and/or polishing techniques known for forming steel parts.

Once the sliding camshaft 20 has been formed and/or shaped to define a desired shape, the sliding camshaft 20 is processed with a carbon infusing heat treatment process. The step of heat treating the sliding camshaft 20 with the carbon infusing heat treatment process is generally indicated by box 32 in FIG. 2.

The carbon infusing heat treatment process may include, but is not limited to, a carburizing heat treatment process or a carbonitriding heat treatment process. As is known to those skilled in the art, the carburizing heat treatment process is a heat treatment process in which the steel alloy absorbs carbon liberated from a carbon bearing material, when the steel alloy is heated to a carburizing temperature in the presence of the carbon bearing material. The carbon bearing material may include for example, but is not limited to, charcoal or carbon monoxide. The carburizing heat treatment process may include either a gas carburizing process or a low pressure carburizing process as are known in the art.

As is known to those skilled in the art, carbonitriding is similar to gas carburization with the addition of ammonia to the carburizing atmosphere, which provides a source of nitrogen. Nitrogen is absorbed at the surface and diffuses into the workpiece along with carbon. Carbonitriding (around 850° C./1550° F.) is carried out at temperatures substantially higher than plain nitriding (around 530° C./990° F.) but slightly lower than those used for carburizing (around 950° C./1700° F.) and for shorter times.

The carbon infusing heat treatment process is used to increase the carbon content of the low carbon steel used to form the sliding camshaft 20, near the surface of the sliding camshaft 20, while simultaneously keeping the carbon content of the central regions of the sliding camshaft 20 at low carbon steel levels. When low carbon steel is heat treated with the carbon infusion process, such as carburization or carbonitriding, the carbon content near the surface of the part is increased, but the central regions of the part maintain their low carbon content. This ensures that the central regions of the part are more pliable and maintains a high toughness, while providing the surface regions of the part with a high hardness. In contrast, when a high carbon steel is heat treated, the entirety of the part, including the central regions, become harder and often become less pliable and more brittle.

If the sliding camshaft is processed with the carburizing heat treatment process, the sliding camshaft 20 is heated to the carburizing temperature, which is preferably between 900° C. and 1100° C. The temperature of the sliding camshaft 20 is maintained at the carburizing temperature, in the presence of the carbon bearing material, for a pre-determined period of time. Preferably, the pre-determined period of time is between 3 hours and 6 hours. However, the pre-determined period of time may vary from the exemplary embodiment described herein.

After the sliding camshaft 20 has been processed with the carbon infusing heat treatment process, the sliding camshaft 20 is then processed with a quenching heat treatment process. Specifically, the quenching heat treatment process may be defined as a mar-quenching heat treatment process. As is known in the art, quenching is a heat treatment process that includes the rapid cooling of a work piece. As is known in the art, mar-quenching is the incremental or stepped cooling of the work piece during the quenching process.

The mar-quenching heat treatment process includes heating the sliding camshaft 20 to a quenching temperature. The step of heating the sliding camshaft 20 to the quenching temperature is generally indicated by box 34 in FIG. 2. The quenching temperature is a temperature that is greater than the martensite start temperature (Ms) of the steel alloy. For example, the quenching temperature of the sliding camshaft 20 is preferably between 150° C. and 300° C. However, it should be appreciated that the quenching temperature will vary for different materials. The sliding camshaft 20 is heated to the quenching temperature until all sections of the sliding camshaft 20 are heated to the quenching temperature.

Once the entire sliding camshaft 20 is heated to the quenching temperature, the sliding camshaft 20 is submersed in a cooling fluid. The step of submersing the sliding camshaft 20 in the cooling fluid is generally indicated by box 36 in FIG. 2. Preferably, the cooling fluid includes a bath of oil. However, it should be appreciated that the cooling fluid may include some other fluid such as air, or some other liquid, such as a salt bath. The cooling fluid, e.g., the bath of oil, is pre-heated to a pre-determined temperature. Preferably, the cooling fluid is pre-heated to a temperature of at least 200° C. prior to submersing the sliding camshaft 20 in the bath of oil. More preferably, the cooling fluid is pre-heated to a temperature between 230° C. and 270° C.

Once the cooling fluid, e.g., the bath of oil, is pre-heated to the pre-determined temperature, e.g., 250° C., the sliding camshaft 20 is submersed in the cooling fluid. The sliding camshaft 20 remains submersed in the cooling fluid until the temperature of the sliding camshaft 20 is uniform throughout all sections of the sliding camshaft 20, and substantially equal to the temperature of the cooling fluid. Once the temperature of the sliding camshaft 20 has been reduced to the pre-determined temperature of the cooling fluid, then the sliding camshaft 20 is removed from the cooling fluid and cooled to the ambient temperature. The step of cooling the sliding camshaft 20 to ambient temperature is generally indicated by box 38 in FIG. 2.

The sliding camshaft 20 manufactured in accordance with the method described above exhibits higher wear resistance than sliding camshafts 20 manufactured from high carbon steels, such as AISI 52100 steel, with less distortion than occurs in sliding camshafts 20 manufactured from high carbon steels, such as AISI 52100 steel. The manufacturing process described above, in which the sliding camshaft 20 is manufactured from the low carbon steel alloy, e.g., SAE 4340 steel, and heat treated with the carbon infusing heat treatment process to increase the carbon content of the low carbon steel near the surface of the sliding camshaft 20 while maintaining a low carbon content near the core of the sliding camshaft 20, followed by the mar-quenching heat treatment process, is a unique process that increases the quality and durability of the sliding camshaft 20 compared to prior manufacturing methods employed to produce camshafts.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of manufacturing a sliding camshaft for an internal combustion engine, the method comprising:
providing the sliding camshaft from a steel alloy having a carbon content between 0.25% and 0.60% by weight;
processing the sliding camshaft with a carbon infusing heat treatment process; and
processing the sliding camshaft with a quenching heat treatment process after the sliding camshaft has been processed with the carbon infusing heat treatment process;
wherein processing the sliding camshaft with the quenching heat treatment process is further defined as processing the sliding camshaft with a mar-quenching heat treatment process, which includes:
heating the sliding camshaft to a quenching temperature;
submersing the sliding camshaft in a bath of oil; and
pre-heating the bath of oil to a temperature of at least 200° C. prior to submersing the sliding camshaft in the bath of oil.

2. The method set forth in claim 1 wherein the steel alloy includes between 0.5% and 2% by weight Chromium, between 0.5% and 2.0% by weight Manganese, between 0% and 3.5% by weight Nickel, between 0% and 0.8% by weight Molybdenum, between 0% and 0.1% by weight Silicon, a maximum of 0.1% by weight Sulfur, and a maximum of 0.05% by weight Phosphorous.

3. The method set forth in claim 1 wherein processing the sliding camshaft with the carbon infusing heat treatment process includes heating the sliding camshaft to a carburizing temperature in the presence of a carbon bearing material.

4. The method set forth in claim 3 wherein the carburizing temperature is between 900° C. and 1100° C.

5. The method set forth in claim 3 wherein processing the sliding camshaft with the carbon infusing heat treatment process includes maintaining the temperature of the sliding camshaft at the carburizing temperature in the presence of the carbon bearing material for a pre-determined period of time.

6. The method set forth in claim 5 wherein the pre-determined period of time is between 3 hours and 6 hours.

7. The method set forth in claim 1 wherein the carbon infusing heat treatment process is either a gas carburizing process, a low pressure carburizing process, or a carbonitriding process.

8. The method set forth in claim 1 wherein the quenching temperature is between 150° C. and 300° C.

9. The method set forth in claim 1 wherein pre-heating the bath of oil to a temperature of at least 200° C. is further defined as pre-heating the bath of oil to a temperature between 230° C. and 270° C.

10. The method set forth in claim 1 wherein processing the sliding camshaft with the mar-quenching heat treatment process includes maintaining the sliding camshaft in the bath of oil until the temperature of the sliding camshaft is uniform throughout all sections of the sliding camshaft and substantially equal to the temperature of the bath of oil.

11. The method set forth in claim 10 further comprising cooling the sliding camshaft to an ambient temperature after all sections of the sliding camshaft have cooled to the temperature of the bath of oil.

12. A method of manufacturing a sliding camshaft for an internal combustion engine, the method comprising:
providing the sliding camshaft from a steel alloy having a Carbon content between 0.25% and 0.60% by weight, a chromium content between 0.5% and 2% by weight, a Manganese content between 0.5% and 2.0% by weight, a Nickel content between 0% and 3.5% by weight, a Molybdenum content between 0% and 0.8% by weight, a Silicon content between 0% and 0.1% by weight, a maximum Sulfur content of 0.1% by weight, and a maximum Phosphorous content of 0.05% by weight;
processing the sliding camshaft with a carbon infusing heat treatment process;
wherein processing the sliding camshaft with the carbon infusing heat treatment process includes maintaining the temperature of the sliding camshaft at the carburizing temperature in the presence of the carbon bearing material for a pre-determined period of time of between 3 hours and 6 hours; and
processing the sliding camshaft with a mar-quenching heat treatment process after the sliding camshaft has been processed with the carburizing heat treatment process;
wherein processing the sliding camshaft with the mar-quenching heat treatment process includes heating the sliding camshaft to a quenching temperature of between 150° C. and 300° C., and then submersing the sliding camshaft in a bath of oil pre-heated to a temperature of between 230° C. and 270° C.

13. The method set forth in claim 12 wherein processing the sliding camshaft with the carbon infusing heat treatment process includes heating the sliding camshaft to a carburizing temperature of between 900° C. and 1100° C., in the presence of a carbon bearing material.

* * * * *